United States Patent
Park

(10) Patent No.: US 8,929,886 B2
(45) Date of Patent: Jan. 6, 2015

(54) APPARATUS AND METHOD FOR ALLOCATING RESOURCE IN MULTI-BEAM SATELLITE COMMUNICATION

(75) Inventor: Un Hee Park, Gwangju (KR)

(73) Assignee: Electronics and Telecommunications Research Institute, Daejeon (KR)

(*) Notice: Subject to any disclaimer, the term of this patent is extended or adjusted under 35 U.S.C. 154(b) by 151 days.

(21) Appl. No.: 13/561,220

(22) Filed: Jul. 30, 2012

(65) Prior Publication Data

US 2013/0244570 A1 Sep. 19, 2013

(30) Foreign Application Priority Data

Mar. 13, 2012 (KR) .................. 10-2012-0025743

(51) Int. Cl.
*H04W 4/00* (2009.01)
(52) U.S. Cl.
USPC .......................................... 455/427; 455/522

(58) Field of Classification Search
USPC .................................................. 455/522, 450
See application file for complete search history.

(56) References Cited

U.S. PATENT DOCUMENTS

| 5,905,943 | A | * | 5/1999 | Wiedeman et al. ........... 455/11.1 |
| 7,289,460 | B1 | * | 10/2007 | Thacker et al. ............... 370/320 |
| 2004/0092257 | A1 | * | 5/2004 | Chung et al. .................. 455/429 |
| 2008/0233865 | A1 | * | 9/2008 | Malarky et al. .............. 455/12.1 |
| 2010/0118765 | A1 | * | 5/2010 | Agarwal ....................... 370/316 |

* cited by examiner

*Primary Examiner* — Lewis West
(74) *Attorney, Agent, or Firm* — Ladas & Parry LLP

(57) ABSTRACT

A satellite in a multi-beam satellite communication system selects at least some active beams based on a traffic demand of each beam and channel status information of each beam, and allocates a bandwidth and a communication capacity to each active beam such that power flux density (PFD) level of each beam has the same predetermined value.

18 Claims, 3 Drawing Sheets

APPARATUS AND METHOD FOR
ALLOCATING RESOURCE IN MULTI-BEAM
SATELLITE COMMUNICATION

CROSS-REFERENCE TO RELATED
APPLICATION

This application claims priority to and the benefit of Korean Patent Application No. 10-2012-0025743 filed in the Korean Intellectual Property Office on Mar. 13, 2012, the entire contents of which are incorporated herein by reference.

BACKGROUND OF THE INVENTION (a) Field of the Invention

The present invention relates to an apparatus and method for allocating a resource in multi-beam satellite communication, and an apparatus and method for selecting an active beam and allocating a bandwidth resource in multi-beam satellite communication on the assumption that power flux density of each beam stays constant.

(b) Description of the Related Art

In satellite communication systems, a wave radiated from a satellite to the ground surface is referred to as a beam, and the ground surface irradiated by the beam is referred to as a cell. The satellite communication systems include a single beam satellite communication system in which a satellite uses a single beam, and a multi-beam satellite communication system in which two or more different spot beams are used.

In the multi-beam satellite communication system, a service area is divided into a plurality of cells, and a mobile terminal forms a communication link with a satellite through a beam corresponding to the user, and receives a service through the communication link.

In the multi-beam satellite communication, as dynamic allocation of limited satellite resources such as power, bandwidth, or spot beams is enabled in consideration of traffic demand and channel status of each spot beam, the overall system capacity is expected to grow by a flexible system configuration.

Currently, the International Telecommunication Union (ITU) specifies and regulates power flux density (PFD) levels of signals transmitted from a satellite to the ground to limit interference effects that may be exerted on adjacent spot beams or other ground reception and communication facilities, which is a requirement that is necessarily taken into account in the design of a satellite communication system.

To solve the problem of a large variation width in interference level between adjacent beams that may occur in a dynamic resource allocation scheme for a multi-beam satellite system, there is a need for a method that is capable of maximizing the utilization of limited satellite resources to increase overall system capacity on the assumption that PFD stays constant to keep the interference level of each spot beam at a fixed level.

SUMMARY OF THE INVENTION

The present invention has been made in an effort to provide a resource allocation apparatus and method for maximizing the utilization of limited satellite resources on the assumption that the PFD of each spot beam stays constant.

An exemplary embodiment of the present invention provides a method for a satellite to allocate a satellite resource in a satellite communication system using multiple beams. The resource allocation method includes: selecting at least some active beams among a plurality of beams having a traffic demand based on a traffic demand of each beam and channel status information of each beam; determining the bandwidth of the at least some active beams based on the traffic demand of each active beam and the channel status information of each active beam; and allocating communication capacity of each active beam based on the bandwidth of each active beam.

The resource allocation method may further include determining the transmission power of the active beam such that a power flux density (PFD) level of the plurality of beams maintains a predetermined value.

The determining of the bandwidth may include determining the bandwidth of each active beam such that a difference between the traffic demand of each active beam and the allocatable communication capacity of each active beam is minimal.

The resource allocation method may further include receiving the traffic demand of each beam and the channel status information of each beam from a satellite gateway.

The selecting of an active beam may include selecting a predetermined number of beams having higher values among values calculated according to an equation for each beam, wherein the equation may be $2T_i \log_2(\alpha_i^2 \rho)$, and Ti may represent the traffic demand of the i-th beam, $\alpha_i$ may represent channel status information of the i-th beam, and $\rho$ may represent the PFD of the i-th beam.

Another exemplary embodiment of the present invention provides an apparatus for allocating a satellite resource in a multi-beam satellite communication system. The resource allocation apparatus includes: a receiver that receives a traffic demand of a plurality of beams and channel status information of the plurality of beams; an active beam selector that selects at least some active beams based on the traffic demand of each beam and the channel status information of each beam; and a resource allocation controller that allocates a communication capacity to each active beam such that power flux density (PFD) level of each beam has the same predetermined value.

The resource allocation controller may determine the bandwidth of each active beam such that a difference between the traffic demand of each active beam and allocatable communication capacity of each active beam is minimal.

The resource allocation controller may control the transmission power of each active beam based on the bandwidth of each active beam such that the PFD level of each beam has the predetermined value.

The resource allocation controller may calculate the communication capacity of each active beam based on the bandwidth of each active beam and the channel status information of each active beam.

The active beam selector may select active beams in consideration of the same PFD level of the beams.

DETAILED DESCRIPTION OF THE EMBODIMENTS

Figure 1:
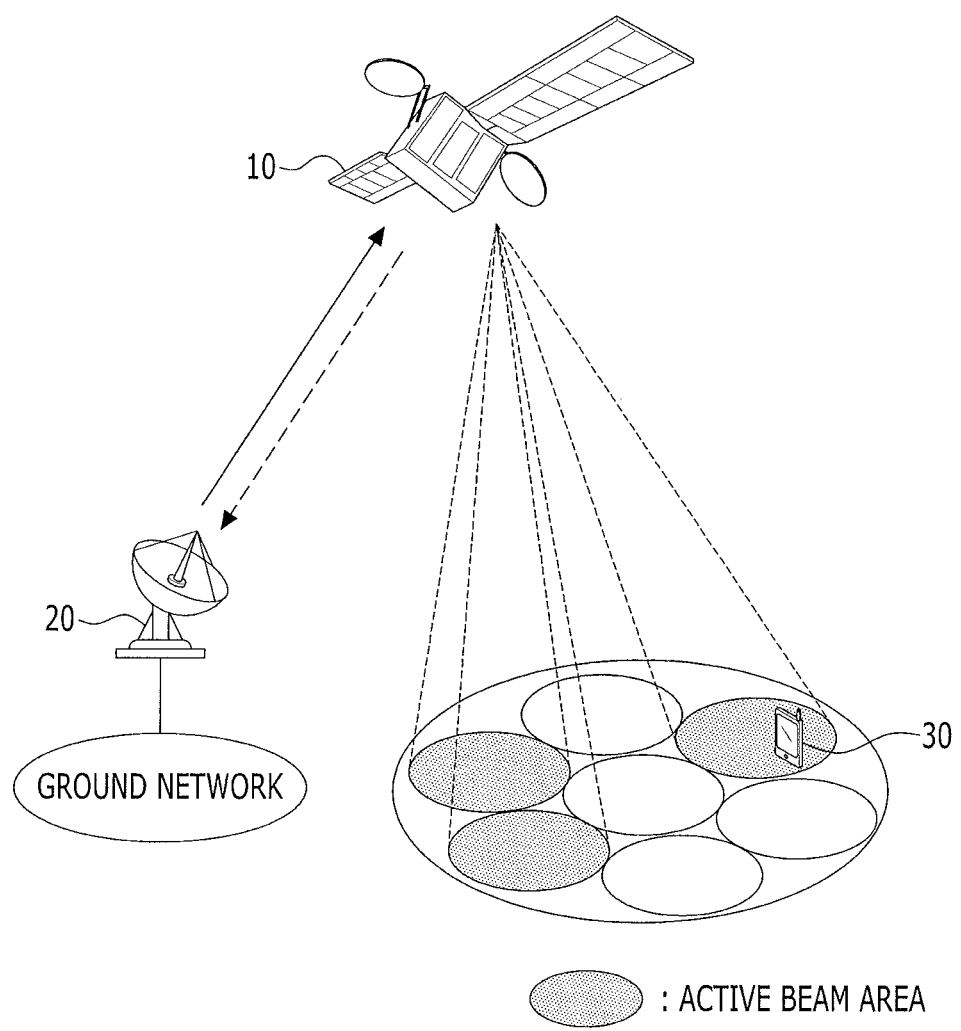
FIG. 1 is a view showing a multi-beam satellite communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, an apparatus and method for allocating a resource in a multi-beam satellite communication system according to an exemplary embodiment of the present invention will be described in detail with reference to the drawings.

FIG. 1 is a view showing a multi-beam satellite communication system according to an exemplary embodiment of the present invention.

Referring to FIG. 1, the multi-beam satellite communication system includes a satellite 10 and a satellite gateway 20, and performs communication with a user terminal 30.

The satellite 10 relays communication between the satellite gateway 20 and the user terminal 30 or between user terminals 30.

The satellite 10 uses multiple beams. A wave radiated from the satellite 10 to the ground surface is referred to as a beam, and a beam area is referred to as a cell. A service area consists of a plurality of cells serviced by multiple beams of the satellite 10, and the user terminal forms a communication link with the satellite 10 through a beam corresponding to the user.

The satellite 10 has a beam pattern with a beam width that is narrow enough to disregard interference between beams. A variety of beams may exist in the satellite 10. A beam according to an exemplary embodiment of the present invention may be a spot beam.

The satellite 10 selects an active beam from the multiple beams carrying traffic to perform communication with the user terminal 30, and allocates a satellite radio resource to the selected active beam, whereby communication with the user terminal 30 is performed through the active beam.

The satellite 10 dynamically allocates a radio resource for each packet transmission by taking resource use and interference of other beams into consideration. Particularly, the power flux density (PFD) level of each beam is kept constant so that the interference level between adjacent beams is fixed, and the satellite 10 selects an active beam and allocates a radio resource to the selected active beam by taking the channel status and traffic demand of each beam into account when the PFD level of each beam is constant.

The satellite gateway 20 relays between a plurality of ground networks or other radio communication networks, such as the Internet, and the satellite 10. Particularly, the satellite gateway 20 collects traffic demand of each beam and a signal attenuation amount corresponding to the channel status of each beam, and transmits them to the satellite 10.

The satellite gateway 20 may perform the same function and role as a base station in a ground network. Accordingly, the user terminal 30 with traffic transmits its information to the satellite gateway 20, whereby the satellite gateway 20 is able to collect a traffic demand of each beam and a signal attenuation amount corresponding to the channel status of each beam.

The user terminal 30 may form a communication link with the satellite 10 through a beam corresponding to the cell where the user is located, and receives a communication service through the satellite 10.

Next, optimum resource allocation in a physical layer will be described with reference to FIGS. 2 and 3 on the assumption that reliable transmission through the function of compensation of distortion caused by a delay, ect in a transport layer protocol is enabled in the multi-beam satellite communication system.

Figure 2:
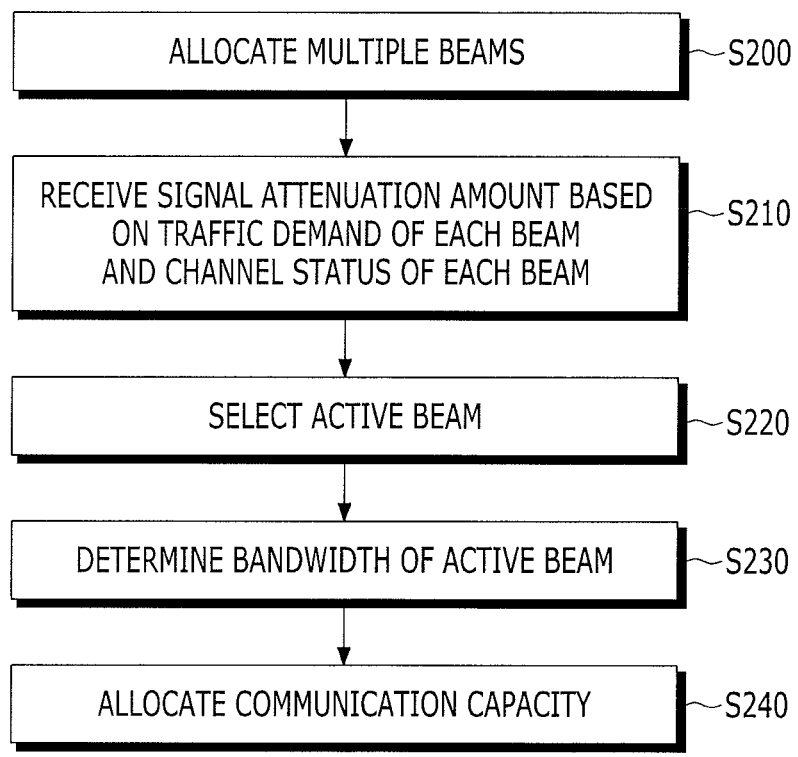
FIG. 2 is a flowchart showing a satellite resource allocation method according to an exemplary embodiment of the present invention.

FIG. 2 is a flowchart showing a satellite resource allocation method according to an exemplary embodiment of the present invention.

Referring to FIG. 2, the satellite 10 allocates multiple beams (S200). When the number of allocated beams is N, the number of active beams that actually allocate a resource among the N multiple beams is N or less.

A beam may have traffic demand by the user terminal 10 corresponding to the beam. Each beam has traffic demand by the user terminal 10 corresponding to the beam and a signal attenuation amount corresponding to the channel status of the beam. The satellite gateway 20 collects traffic demand of each beam and a signal attenuation amount corresponding to the channel status of each beam, and transmits them to the satellite 10.

The satellite 10 receives the traffic demand of each beam and the signal attenuation amount corresponding to the channel status of each beam from the satellite gateway 20 (S210). The satellite gateway 20 collects the traffic demand of each beam and the signal attenuation amount corresponding to the channel status of each beam, and transmits them to the satellite 10.

The satellite 10 selects an active beam in consideration of the traffic demand of each beam and the signal attenuation amount corresponding to the channel status of each beam (S220).

The satellite 10 determines a beam bandwidth for the selected active beam (S230), and allocates a communication capacity for the active beam by using the determined beam bandwidth (S240).

Next, the satellite 10 determines the transmission power of each active beam such that the active beam has a predetermined PFD level (S250), and controls each active beam so that the active beam has the determined transmission power.

Next, a method for the satellite 10 to determine the beam bandwidth of an active beam, allocate communication capacity, and determine transmission power will be concretely described.

A Shannon's communication capacity of the i-th beam with a limited bandwidth can be represented as in Equation 1.

$$C_i = W_i \log(1 + \alpha_i^2 \rho) \qquad \text{[Equation 1]}$$

wherein, $\alpha_i^2$ represents a signal attenuation amount corresponding to the channel status of the i-th beam, and $\rho$ represents PFD which is obtained by $P_i/W_i N_0$. $\rho$ is a constant on the assumption that each beam has the same PFD level. The PFD level is a predetermined level at which the interference level between adjacent beams may be equal to or less than a threshold value. $P_i$ and $N_0$ represent the transmission power and noise power of a beam, respectively, and $W_i$ represents a bandwidth resource which is controlled to allocate a different communication capacity to each beam.

According to an exemplary embodiment of the present invention, a reasonable solution for the problem of trade-off of fairness between users and overall system capacity by allocating a beam bandwidth resource in consideration of a traffic demand and channel status of each beam to maximize the utilization of resources is suggested. To this end, the satellite 10 aims to make communication capacity $C_i$ and traffic demand $T_i$ consistent with each other as much as possible. That is, the satellite 10 uses a cost function for calculating a minimum value of a general function for the difference between $\{C_i\}$ and $\{T_i\}$ for every cell in order to allocate a beam bandwidth. The cost function is as shown in Equation 2.

$$\text{Minimize } \Sigma(T_i - C_i)^2 \qquad \text{[Equation 2]}$$

In general, allocatable satellite resources are very limited, as compared to a required signal amount desired by users. Therefore, a bandwidth allocated to a beam cannot be greater than the desired and required signal amount. Such a constraint is as shown in Equation 3.

The sum of bandwidths $W_i$ allocated to each beam cannot exceed the total bandwidth the satellite 10 can allocate. Such a constraint is as shown in Equation 4.

The satellite 10 determines an optimum resource allocation scheme associated with communication capacity and bandwidth efficiency by taking Equation 3 and Equation 4 into consideration.

$$C_i = W_i \log_2(1 + \alpha_i^2 \rho) \leq T_i \qquad \text{[Equation 3]}$$

$$\sum_{i=1}^{N} W_i \leq W_{total} \qquad \text{[Equation 4]}$$

To solve the problem of convex optimization with the constraints shown in Equation 3 and Equation 4, a beam bandwidth that is optimized based on the cost function of Equation 2 and the constraints of Equation 3 and Equation 4 is achieved by calculating the solution of the Lagrange function as shown in Equation 5.

$$L(W_i, \Lambda) = \Sigma(T_i - C_i)^2 + \Lambda(\Sigma W_i - W_{total}) = \Sigma[T_i - W_i \log(1 + \alpha_i^2 \rho)]^2 + \Lambda(\Sigma W_i - W_{total}) \qquad \text{[Equation 5]}$$

Herein $\Lambda$ is a Lagrange multiplier, which is determined according to the total bandwidth $W_{total}$ total that the satellite 10 can allocate. If $\Lambda$ always has a value greater than 0, this means that the constraint of Equation 3 is satisfied.

Equation 6 may be applied to the Equation 5 by the definition of a Kuhn-Tucker theorem.

$$\frac{\partial L(W_i, \Lambda)}{\partial W_i} = 0 \qquad \text{[Equation 6]}$$

According to the definition of Equation, when a value obtained by partially differentiating Equation 5 at $W_i$ is 0, an optimum beam bandwidth allocation formula can be obtained for a traffic demand of each beam in a multi-beam satellite communication system. The optimum beam bandwidth allocation formula for a traffic demand of each beam may be as shown in Equation 7.

$$W_i = \frac{1}{b_1}\left(T_i - \frac{b_2}{b_3 - b_4}\right) \qquad \text{[Equation 7]}$$

In Equation 7, b1, b2, b3, and b4 are constants and are as shown in Equation 8.

$$b_1 = \log(1 + \alpha_i^2 \rho),$$

$$b_2 = \frac{\Lambda W_i \ln 2}{2}(1 + \alpha_i^2 \rho), \qquad \text{[Equation 8]}$$

$$b_3 = W_i \ln 2(1 + \alpha_i^2 \rho)\log(1 + \alpha_i^2 \rho),$$

$$b_4 = \alpha_i^2 \rho$$

The satellite 10 can calculate the optimum beam bandwidth $W_i$, which yields a minimal difference between the traffic demand of each beam and an allocatable communication capacity, by the beam bandwidth allocation formula in Equation 7.

Once the beam bandwidth $W_i$ is calculated, the satellite 10 calculates the communication capacity $C_i$ based on Equation 3, and the calculated communication capacity $C_i$ satisfies the cost function of Equation 2.

Next, once the beam bandwidth $W_i$ is calculated, the satellite 10 controls the transmission power $P_i$ of the beam so that $\rho$ has a value at a predetermined level.

For a method for selecting an active beam based on a beam bandwidth allocation formula using the same PFD for each beam, an important satellite resource in the multi-beam satellite communication system will be concretely described.

The satellite 10 takes the constraint of Equation 9 into consideration in order to select an active beam. Equation 9 means that a bandwidth other than 0 has to be allocated to an active beam selected for resource allocation.

$$-W_i \leq 0 \qquad \text{[Equation 9]}$$

To find the best solution to the selection of an active beam in the problem of minimization with the constraint function of Equation 9, Equation 10 can be derived by adding the condition of Equation 9 to Equation 5 using the Lagrange function.

$$L(W_i, \Lambda, v_i) = \Sigma_i(T_i - C_i)^2 + \Lambda(\Sigma_i W_i - W_{total}) + \Sigma_i v_i(-W_i) \qquad \text{[Equation 10]}$$

In Equation 10, $v_i$ is an added Lagrange coefficient, which is determined by the constraint of Equation 9.

In the same manner as the above-explained Equation 6 and Equation 7, Equation 11 can be obtained by partially differentiating Equation 10 at $W_i$.

$$\frac{\partial L(W_i, \Lambda, v_i)}{\partial W_i} = \frac{\partial \Sigma_i(T_i - C_i)^2}{\partial W_i} + \Lambda - v_i \qquad \text{[Equation 11]}$$

Equation 12 and Equation 13 can be defined by the definition of the Kuhn-Tucker vector.

$$\text{When } W_i > 0, v_i = 0 \qquad \text{[Equation 12]}$$

$$\text{When } W_j = 0, v_j \geq 0 \qquad \text{[Equation 13]}$$

First, provided that the optimum beam bandwidth $W_i^*$ is greater than 0 ($W_i^* > 0$), Equation 14 is yielded according to Equation 12 and the Lagrange function theory.

$$v_i = 0, \qquad \text{[Equation 14]}$$

$$\left.\frac{\partial L(W_i, \Lambda, v_i)}{\partial W_i}\right|_{W_i = W_i^*} = 0$$

Accordingly, Equation 15 can be derived from Equation 11 and Equation 14.

$$-\frac{\partial \Sigma_i(T_i - C_i)^2}{\partial W_i}\bigg|_{W_i=W_i^*} = \Lambda < -\frac{\partial \Sigma_i(T_i - C_i)^2}{\partial W_i}\bigg|_{W_i=0} \quad \text{[Equation 15]}$$

By the concavity properties of the communication capacity $C_i$, the inequality relation in Equation 15 is established.

Next, provided that the optimum beam bandwidth is obtained when $W_j$ of the j-th beam is 0, Equation 16 is yielded according to Equation 13 and the Lagrange function theory.

$$v_j \geq 0,$$
$$\frac{\partial L(W_j, \Lambda, v_j)}{\partial W_j}\bigg|_{W_j=0} = 0 \quad \text{[Equation 16]}$$

Accordingly, Equation 17 can be derived from Equation 11 and Equation 16.

$$-\frac{\partial \Sigma_i(T_i - C_i)^2}{\partial W_j}\bigg|_{W_j=0} + v_j = \Lambda \geq -\frac{\partial \Sigma_j(T_j - C_j)^2}{\partial W_j}\bigg|_{W_j=0} \quad \text{[Equation 17]}$$

By comparing the right sides of Equations 15 and 17 for the common factor $\Lambda$ of Equations 15 and 17, the satellite 10 selects a predetermined number of active beams in descending order of the value of Equation 18 for each beam having the traffic demand.

$$-\frac{\partial \Sigma_i(T_i - C_i)^2}{\partial W_i}\bigg|_{W_i=0} = 2T_i \log_2(\alpha_i^2 \rho) \quad \text{[Equation 18]}$$

In this way, the satellite 10 selects a predetermined number of active beams from multiple beams based on Equation 18. As such, a beam causing a degradation of the overall performance of the system is excluded from service targets, and therefore the total throughput of the system can be improved.

Figure 3:
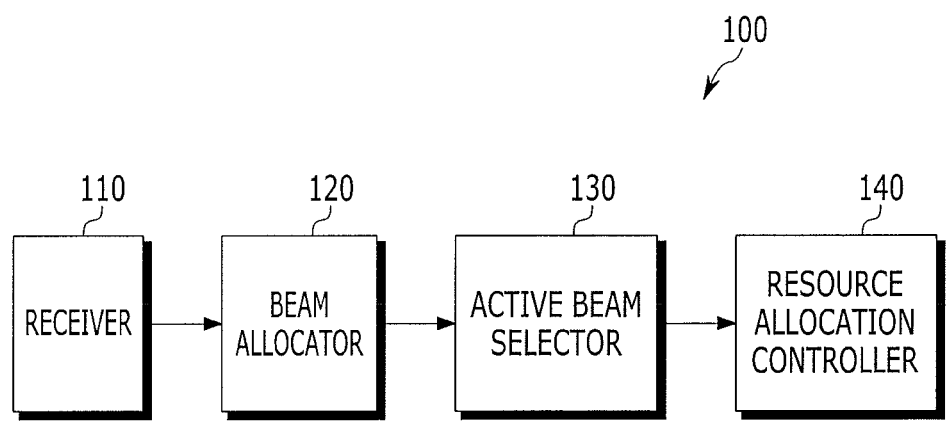
FIG. 3 is a view schematically showing a satellite resource allocation apparatus according to an exemplary embodiment of the present invention.

FIG. 3 is a view schematically showing a satellite resource allocation apparatus according to an exemplary embodiment of the present invention.

Referring to FIG. 3, the resource allocation apparatus 100 of the satellite 10 includes a receiver 110, a beam allocator 120, an active beam selector 130, and a resource allocation controller 140.

The receiver 110 receives a traffic demand of each beam and a signal attenuation amount corresponding to the channel status of each beam from the satellite gateway 20.

The beam allocator 120 allocates multiple beams.

The active beam selector 130 selects an active beam from the multiple beams in consideration of the traffic demand of each beam and the signal attenuation amount corresponding to the channel status of each beam. Particularly, the active beam selector 130 selects a predetermined number of active beams in descending order of the value of Equation 18 for each beam having the traffic demand.

The resource allocation controller 140 determines an optimum beam bandwidth for the active beams, and allocates a communication capacity for the active beams by using the determined beam bandwidth. Moreover, the resource allocation controller 140 determines the transmission power of each active beam such that the active beams have the same PFD level, and controls the transmission power of each active beam.

Particularly, the resource allocation controller 140 determines an optimum beam bandwidth for the traffic demand of the active beams based on Equation 7, and allocates a communication capacity of the active beams by using the determined beam bandwidth based on Equation 3. Further, the resource allocation controller 140 can determine the transmission power of each active beam such that the active beams have the same PFD level. As the PFD level is predetermined, the transmission power of an active beam can be determined from the equation $\rho = P_i/W_i N_0$.

According to an exemplary embodiment of the present invention, regarding the problem of a large variation width in interference level between adjacent beams that may occur in a dynamic resource allocation scheme for a multi-beam satellite system, interference effects on adjacent beams or other ground communication facilities can be reduced by keeping the PFD of each beam constant, and the design of the multi-beam satellite communication system can be facilitated.

The exemplary embodiments of the present invention are not only realized by the apparatus and method described above, but are also realized by a program for realizing functions corresponding to the configurations of the exemplary embodiments of the present invention or a recording medium for recording the program. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a satellite to allocate a satellite resource in a multi-beam satellite communication system, the method comprising:
    maintaining a power flux density (PFD) level of the plurality of beams as a predetermined value;
    selecting at least some active beams among a plurality of beans having a traffic demand based on a traffic demand of each beam, channel status information of each beam, and the PFD level of each beam;
    determining the bandwidth of the at least some active beams based on the traffic demand of each active beam, the channel status information of each active beam, and the PFD level of each active beam;
    allocating communication capacity of each active beam based on the bandwidth of each active beam and the PFD level of each active beam; and
    determining a tranmission power of each active beam such that the PFD level of each active beam maintains the predetermined value.

2. The method of claim 1, wherein the determining of the bandwidth comprises
    determining the bandwidth of each active beam such that a difference between the traffic demand of each active beam and the allocatable communication capacity of each active beam is minimal.

3. The method of claim 1, further comprising receiving the traffic demand of each beam and the channel status information of each beam from a satellite gateway.

4. The method of claim 1, wherein the channel status information comprises a signal attenuation amount corresponding to the channel status.

5. The method of claim 1, wherein the selecting of at least some active beams comprises selecting a predetermined number of beams having higher values among values calculated according to an equation for each beam, wherein the equation is $2T_i \log_2(\alpha_i^2 \rho)$, and $T_i$ represents the traffic demand of the i-th beam, $\alpha_i$ represents channel status information of the i-th beam, and $\rho$ represents the PFD of the i-th beam.

6. A method for a satellite to allocate a satellite resource in a multi-beam satellite communication system, the method comprising:

selecting at least some active beams among a plurality of beams having a traffic demand based on a traffic demand of each beam and channel status information of each beam;

determining the bandwidth of the at least some active beams based on the traffic demand of each active beam and the channel status information of each active beam; and allocating communication capacity of each active beam based on the bandwidth of each active beam, wherein the selecting of at least some active beams comprises selecting a predetermined number of beams having higher values among values calculated according to an equation for each beam, wherein the equation is $2T_i \log_2(\alpha_i^2 \rho)$, and $T_i$ represents the traffic demand of the i-th beam, $\alpha_i$ represents channel status information of the i-th beam, and $\rho$ represents the PFD of the i-th beam.

7. The method of claim 6, further comprising determining the transmission power of each active beam such that a power flux density (PFD) level of the plurality of beams maintains a predetermined value.

8. The method of claim 6, wherein the determining of the bandwidth comprises determining the bandwidth of each active beam such that a difference between the traffic demand of each active beam and the allocatable communication capacity of each active beam is minimal.

9. The method of claim 6, further comprising receiving the traffic demand of each beam and the channel status information of each beam from a satellite gateway.

10. The method of claim 6, wherein the channel status information comprises a signal attenuation amount corresponding to the channel status.

11. The method of claim 6, wherein the PFD level of the plurality of beams has the same value.

12. An apparatus for allocating a satellite resource in a multi-beam satellite communication system, the apparatus comprising:

a receiver that receives a traffic demand of a plurality of beams, channel status information of the plurality of beams, and power flux density (PFD) level of each beam;

an active beam selector that selects at least some active beams based on the traffic demand of each beam, the channel status information of each beam, and the PFD level of each active beam; and a resource allocation controller that allocates a communication capacity to each active beam such that the PFD level of each beam has the same predetermined value, wherein the resource allocation controller determines the transmission power of each active beam such that the PFD level of each active beam maintains the predetermined value.

13. The apparatus of claim 12, wherein the resource allocation controller determines the bandwidth of each active beam such that a difference between the traffic demand of each active beam and allocatable communication capacity of each active beam is minimal.

14. The apparatus of claim 13, wherein the resource allocation controller controls the transmission power of each active beam based on the bandwidth of each active beam such that the PFD level of each beam has the predetermined value.

15. The apparatus of claim 13, wherein the resource allocation controller calculates the communication capacity of each active beam based on the bandwidth of each active beam and the channel status information of each active beam.

16. The apparatus of claim 12, wherein the active beam selector selects active beams in consideration of the same PFD level of the beams.

17. The apparatus of claim 16, wherein the active beam selector selects a predetermined number of beams having higher values among values calculated according to an equation for each beam, wherein the equation is $2T_i \log_2(\alpha_i^2 \rho)$, and $T_i$ represents the traffic demand of the i-th beam, $\alpha_i$ represents the channel status information of the i-th beam, and $\rho$ represents the PFD of the i-th beam.

18. The apparatus of claim 12, wherein the channel status information comprises a signal attenuation amount corresponding to the channel status.

* * * * *